Oct. 30, 1928.
R. D. JOHNSON
PRESSURE CONTROL SYSTEM
1,689,947
Filed Nov. 28, 1925
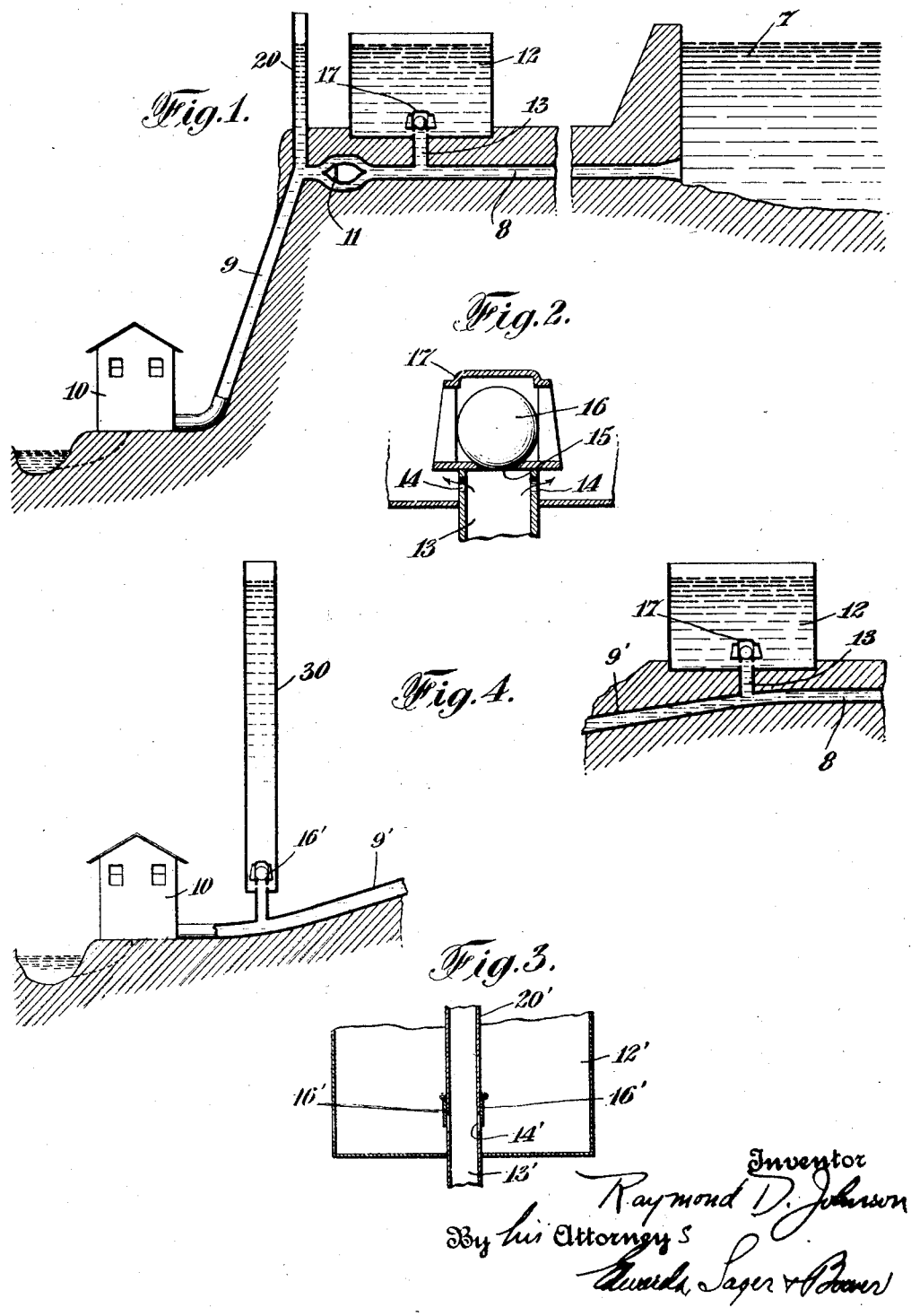

Patented Oct. 30, 1928.

1,689,947

UNITED STATES PATENT OFFICE.

RAYMOND D. JOHNSON, OF NEW YORK, N. Y.

PRESSURE-CONTROL SYSTEM.

Application filed November 28, 1925. Serial No. 71,966.

This invention relates to the control of pressures in pipe lines and particularly in lines for power-houses and the like where the variations in the demand cause fluctuations in the pressures which, unless controlled, will be attended by dangerous surges.

The object of the invention is to provide means for avoiding both excessive drop and excessive rise in pressure whatever the variations in the demand may be. A further object of the invention is to provide a control system which will have a very efficient and smooth action throughout a predetermined normal range of pressure fluctuations.

To this end the system of this invention provides a stand-pipe which may be separate from the usual surge tank and located at a different point in the pipe line so that the stand-pipe or riser and surge tank instead of being limited in cooperation by the inclusion of the stand-pipe within the surge tank, as in prior practice, may be combined in any desired manner most advantageous to the particular demands of each pipe line.

In the accompanying drawings illustrating the invention

Fig. 1 is a diagrammatic sectional view of one embodiment of the invention.

Fig. 2 is an enlarged view of a detail of Fig. 1.

Fig. 3 is a sectional view of a modified form of surge tank, and

Fig. 4 is a view similar to Fig. 1 but showing a modification.

In the system shown in Fig. 1 a reservoir 7 supplies the pipe line 8 leading to penstock 9 carrying the flow to the power-house 10, a valve 11 being sometimes provided to shut off the flow from the pipe 8 when desired. On the upstream side of the valve 11 is the surge tank 12 having a connection 13 from and to the pipe 8. The flow from the connection 13 into the tank 12 passes through the fixed ports 14 and at certain times also through the auxiliary port 15 normally closed by the spherical check valve 16 vertically movable in the cage 17. The ports 14 are of such cross sectional area that the head required to force water through them under a normal load change is the difference or somewhat more than the difference between the elevation of the water in the tank 12 corresponding to the load existing before the change and the level in said tank which will exist after the load change and when conditions have become again quiescent. Under a small decrease of load which forces water into the tank through the ports 14, the valve 16 due to its weight will remain seated so that the water will pass inward only through the ports 14. When, however, the decrease in the load is greater than a predetermined minimum as in case for instance of a complete shutdown of the plant, the head required to force the augmented quantity of rejected water through ports 14 will be greater than under normal conditions and the valve 16 will be elevated from its seat by this higher pressure and will permit additional water to pass through the port 15 thus reducing the excessive pressure on the pipe line.

In case of increased loads where water must be drawn from the tank 12 the outflow will have to pass through the ports 14 since the valve 6 operates as a check valve in this direction.

Cooperating with the surge tank 12 there is also provided the stand-pipe or riser 20. Any changes in draft in penstock 9 will be transmitted directly to this riser, so that a decrease of draft will force water into the riser and raise the level therein while an increase of draft will draw water from the riser and lower the level therein. This riser thus yields to an increase of pressure in the pipe line and tends to decrease any excessive pressure and likewise builds up pressure in the pipe line gradually upon a decrease of draft in penstock 9, and vice versa. In this way the riser cooperates with the surge tank to modify and lessen the pressure rise or pressure drop as the case may be.

The riser 20 is of relatively small cross sectional area and correspondingly small volume and consequently an excessive pressure maintained for any considerable time will cause the level in the riser to rise above the top thereof so that there will be an objectionable overflow. To avoid this the riser is carried up to a sufficient height and the auxiliary port 15 of the main tank is made sufficiently large to hold the pressure rise within the limits of the height of the riser 20. The opening of the valve 16 thus reduces greatly the height to which the water will rise in the stand-pipe 20 and permits this stand-pipe to be made of reasonable height without danger of overflowing. There is also to be noted that the riser 20 does not subtract its area from that of the tank as would be the case were the riser within the tank.

With the riser 20 thus separate from the surge tank 12 a valve 11 may be placed between the tank and the riser thus permitting the riser to act as a vent pipe to prevent collapse of the penstock 9 upon closing of the valve 11. The tank 12 also retains all of its water without making it necessary to empty the tank 12 each time that the valve 11 is closed. The separation of the riser also permits the riser to be of lighter construction as it does not have to be strong enough to resist the inward pressure of the surge tank water when, as on sudden increase in load with the riser in the surge tank, the drop in pressure on the pipe line draws the flow from the riser and thus leaves it partly empty within the filled tank 12.

This combination of the riser with the valve connection 16 to the surge tank automatically adjusts itself to take care of the variable requirements of the plant during operation. The opening of the valve 16 prevents any undue rise in pressure upon decrease in load and the supply of pressure from the riser 20 prevents any sudden change of pressure following a demand for more power. As shown in Fig. 3 with the riser 20' within the tank 12' the ports 14' from the connection 13' may be provided with valve means such as the flaps 16' to give a large inflow into the surge tank upon a rise in pressure and a large outflow from the riser 20' upon a drop in pressure. The advantage of having the ports into the surge tank automatically variable so as to restrict the outflow is that fixed ports of a maximum full open size would be far too large for proper regulation for ordinary increments of load. The combination of a large opening into the surge tank during a rise of pressure and a free opening from the riser during a drop in pressure, while the discharge from the surge tank is restricted, gives the very best control effect for all pressure changes.

Where as shown in Fig. 4 the penstock itself from the surge tank to the power-house is unusually long as compared to the head on the plant it may be desirable to place the riser 30 quite close to the power-house at the bottom of the hill leaving the surge tank itself at the upper end of the penstock 9' at the top of the hill. With the stand-pipe 30 thus interposed between the power-house and the pipe line, the penstock 9' as well as conduit 8 will be protected against excessive pressure variations and the pressure and flow conditions in the line between the stand-pipe and the surge tank will be regulated in addition to the regulation effected in conduit 8.

In some installations it may also be desirable to provide the stand-pipe or riser with a valve 16' (Fig. 4) automatically increasing the opening into the pipe upon excessive pressure rise.

I claim:—

1. In a pressure control system the combination with a relatively elevated reservoir, of a pipe line supplied thereby and having an incline at its end portion, a surge tank connected to said pipe line adjacent the top of said incline, and a separate unenclosed stand-pipe of relatively small cross sectional area connected to said pipe line at a lower point of said incline and extending above the level of the water in said reservoir.

2. In a pressure control system the combination with a relatively elevated reservoir, of a pipe line supplied thereby having an incline at its end portion, a surge tank connected to said pipe line adjacent the top of said incline, and a separate unenclosed stand-pipe of relatively small cross sectional area connected to said pipe line adjacent to the lowermost end of said incline and extending above the level of the water in said reservoir.

RAYMOND D. JOHNSON.